United States Patent [19]

Childers

[11] Patent Number: 5,135,647
[45] Date of Patent: Aug. 4, 1992

[54] FLUID VACUUM APPARATUS AND FILTER BAG FOR CLEANING SWIMMING POOLS AND THE LIKE

[76] Inventor: Richard Childers, 6035 Morning Glory Dr., Harrison, Tenn. 37341

[21] Appl. No.: 694,779

[22] Filed: May 2, 1991

[51] Int. Cl.$^5$ ............................................. B01D 35/02
[52] U.S. Cl. ........................................ 210/136; 15/1.7; 92/128; 210/169; 210/416.2
[58] Field of Search ........................... 15/1.7, 341, 344; 210/136, 169, 232, 416.2, 483, 499, 406, 416.1; 92/128; 55/374, 378

[56] References Cited

U.S. PATENT DOCUMENTS

| | | | |
|---|---|---|---|
| 93,810 | 8/1869 | Crouse | 92/128 |
| 695,492 | 3/1902 | Robertson | 92/128 |
| 1,297,603 | 3/1919 | Smith | 210/136 |
| 2,250,419 | 7/1941 | Johnston et al. | 92/128 |
| 3,158,104 | 11/1964 | Hutchinson | 210/416.2 |
| 3,360,129 | 12/1967 | Powers | 15/1.7 |
| 3,549,015 | 12/1970 | Willinger | 210/416.2 |
| 3,630,364 | 12/1971 | Johnston | 15/1.7 |
| 3,820,182 | 6/1974 | Vockroth | 15/1.7 |
| 4,565,506 | 1/1986 | Williams | 92/128 |
| 4,807,318 | 2/1989 | Kallenbach | 15/1.7 |
| 4,944,101 | 7/1990 | Goble | 15/1.7 |

FOREIGN PATENT DOCUMENTS

| | | | |
|---|---|---|---|
| 721539 | 11/1965 | Canada | 210/169 |
| 2168244A | 6/1986 | United Kingdom | 15/1.7 |

Primary Examiner—Robert A. Dawson
Assistant Examiner—Joseph Drodge
Attorney, Agent, or Firm—Leon Gilden

[57] ABSTRACT

A cylindrical housing mounts a piston therewithin, wherein the piston is reciprocatable relative to the housing, wherein the housing includes a "T" shaped junction, with a first check valve mounted to the "T" shaped junction at a first exhaust conduit to project debris into a flexible porous bag. A second check valve mounted at a lower terminal end of the housing permits directing of fluid into the housing for projection into the bag during use. The bag is formed with reinforcing plates for maintaining the bag in alignment relative to the exhaust conduit. The piston includes discs alternating with flexible membranes, and is secured by easily removable locking pins allowing easy piston maintenance. The apparatus can be used to remove debris from swimming pools.

4 Claims, 4 Drawing Sheets

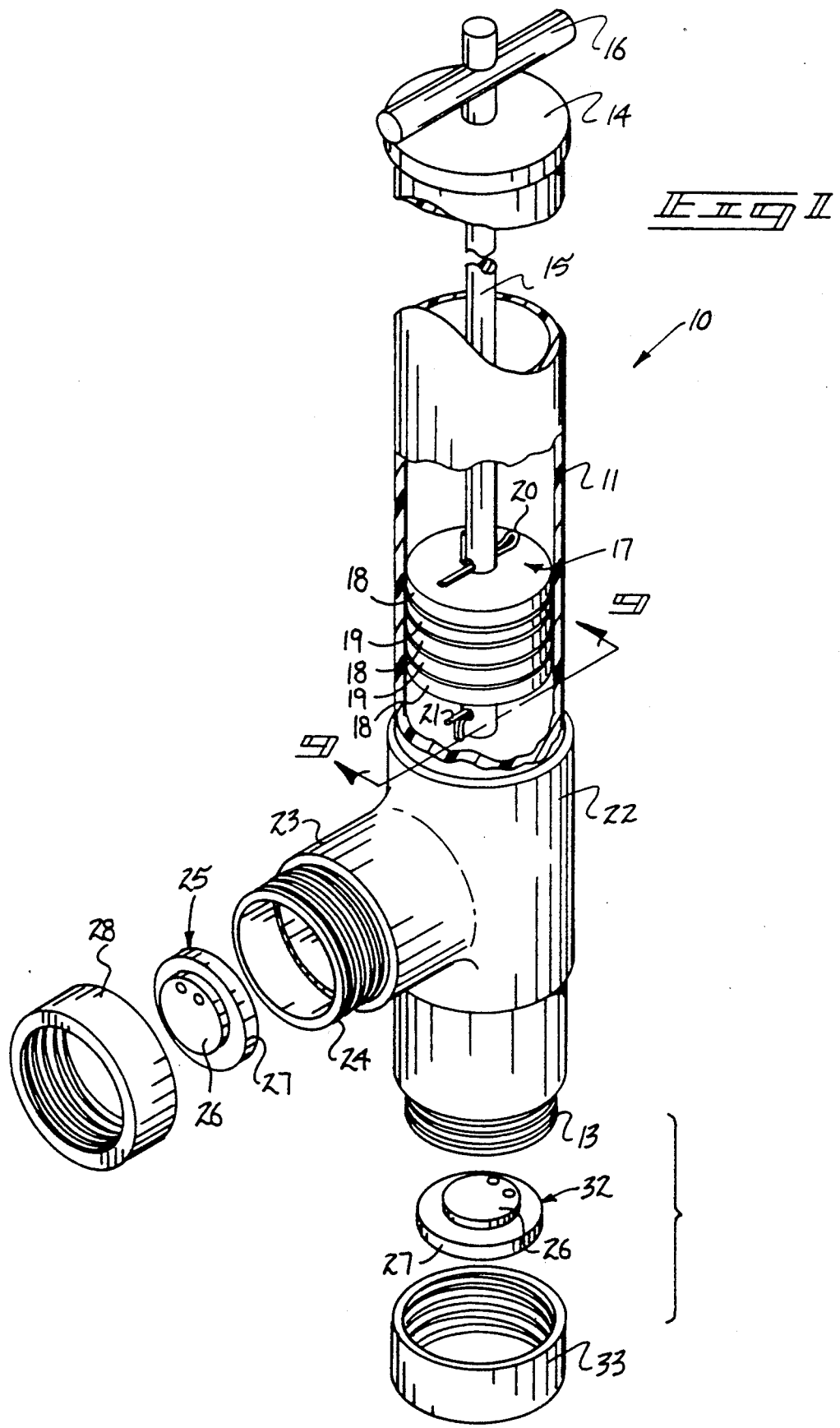

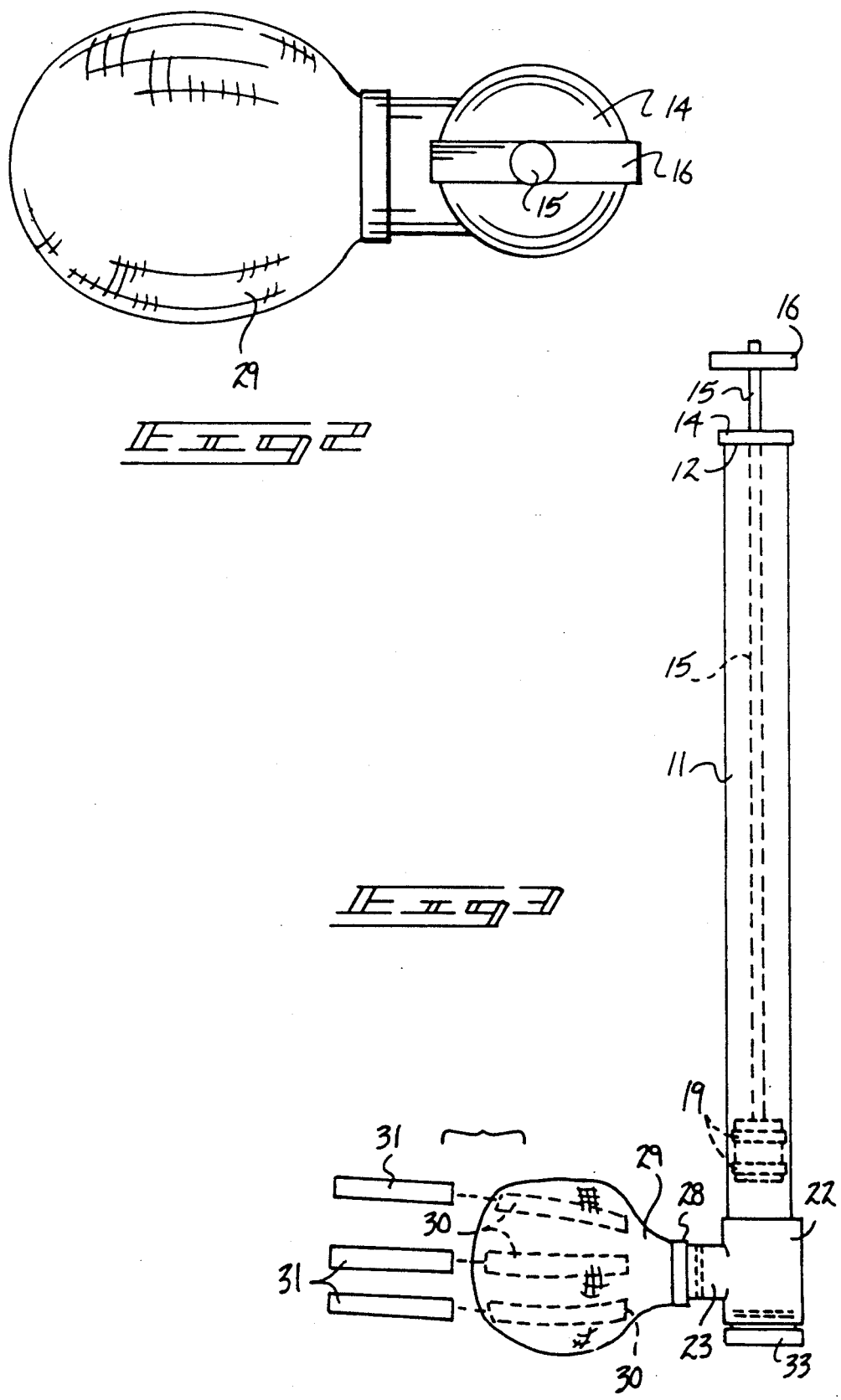

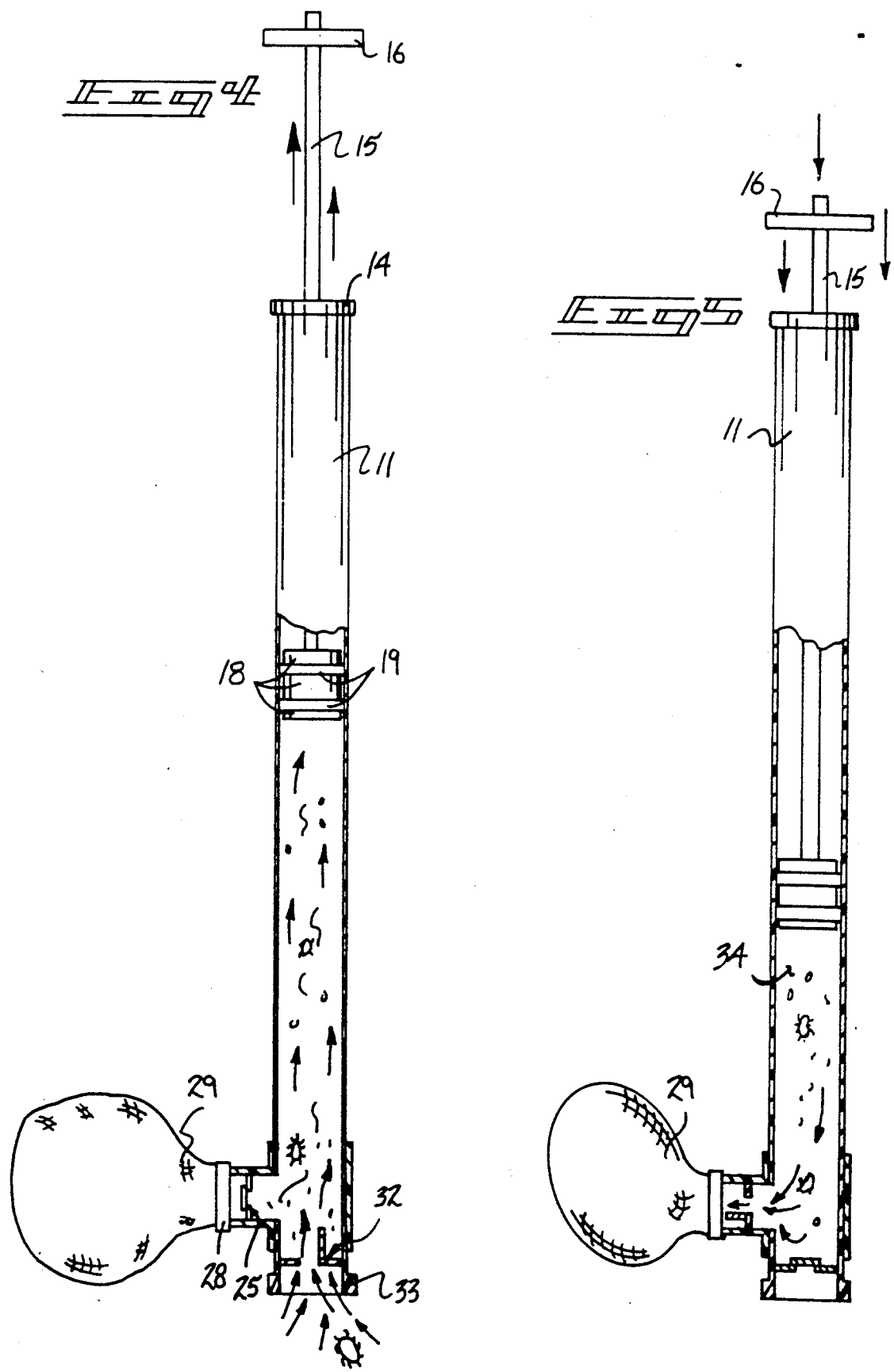

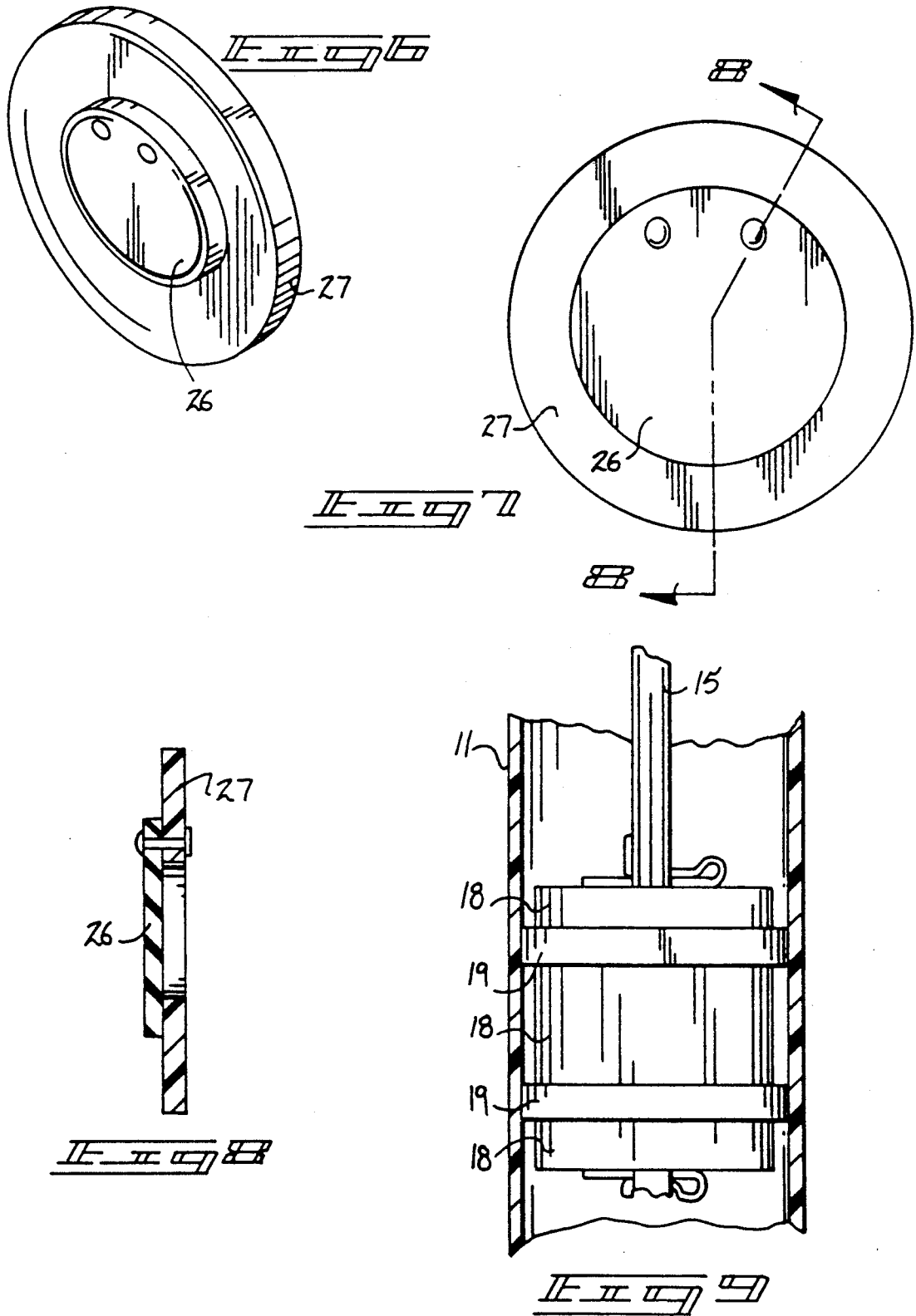

FLUID VACUUM APPARATUS AND FILTER BAG FOR CLEANING SWIMMING POOLS AND THE LIKE

BACKGROUND OF THE INVENTION

1. Field of the Invention

The field of invention relates to vacuum apparatus, and more particularly pertains to a new and improved fluid vacuum apparatus for use in removing debris of a swimming pool surface and the like.

2. Description of the Prior Art

Vacuum apparatus is well known in the prior art to effect a removal of surface debris relative to solid and fluid surfaces. Such apparatus is exemplified in U.S. Pat. No. 3,158,104 to Hutchinson wherein a vacuum apparatus utilizes a squeeze bulb to remove debris from a bottom surface of an aquarium.

U.S. Pat. No. 1,977,328 to Sousley sets forth a siphon adapter for use in bottles.

U.S. Pat. No. 3,549,015 to Willinger sets forth a hand operated aquarium cleaning pump, wherein a bellows mounted to an upper portion of a conduit directs debris into a bag structure.

U.S. Pat. No. 3,214,025 to Halpern sets forth an adapter for laboratory filter equipment, wherein the adapter is arranged for using both vacuum and gravity under pressure to effect filtration.

As such, it may be appreciated that there continues to be a need for a new and improved fluid vacuum apparatus as set forth by the instant invention which addresses both the problems of ease of use as well as effectiveness in construction in providing a readil transportable and manually manipulatable hand operative pump for removing debris from a surface of a swimming pool.

SUMMARY OF THE INVENTION

In view of the foregoing disadvantages inherent in the known types of vacuum apparatus now present in the prior art, the present invention provides a fluid vacuum apparatus wherein a plurality of check valves permits directing of fluid into a bag mounted laterally of a central cylindrical housing. As such, the general purpose of the present invention, which will be described subsequently in greater detail, is to provide a new and improved fluid vacuum apparatus which has all the advantages of the prior art vacuum apparatus and none of the disadvantages.

To attain this, the present invention provides a cylindrical housing mounting a piston therewithin, wherein the piston is reciprocatable relative to the housing, wherein the housing includes a "T" shaped junction, with a first check valve mounted to the "T" shaped junction at a first exhaust conduit to project debris into a flexible porous bag. A second check valve mounted at a lower terminal end of the housing permits directing of fluid into the housing for projection into the bag during use. The bag is formed with reinforcing plates for maintaining the bag in alignment relative to the exhaust conduit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fluid vacuum apparatus which has all the advantages of the prior art vacuum apparatus and none of the disadvantages.

It is another object of the present invention to provide a new and improved fluid vacuum apparatus which may be easily and efficiently manufactured and marketed.

It is a further object of the present invention to provide a new and improved fluid vacuum apparatus which is of a durable and reliable construction.

An even further object of the present invention is to provide a new and improved fluid vacuum apparatus which is susceptible of a low cost of manufacture with regard to both materials and labor, and which accordingly is then susceptible of low prices of sale to the consuming public, thereby making such fluid vacuum apparatus economically available to the buying public.

Still yet another object of the present invention is to provide a new and improved fluid vacuum apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention mounting the flexible bag thereto.

FIG. 3 is an orthographic side view of the invention.

FIG. 4 is an orthographic side view of the invention illustrating the invention in a suction operative mode.

FIG. 5 is an orthographic side view, partially in section, of the invention in a compression mode directing debris into an associated fluid permeable bag member.

FIG. 6 is an isometric illustration of the check valve structure utilized by the instant invention.

FIG. 7 is an orthographic frontal view, taken in elevation, of the check valve member.

FIG. 8 is an orthographic view, taken along the lines 8—8 of FIG. 7 in the direction indicated by the arrows.

FIG. 9 is an orthographic cross-sectional illustration of the piston member utilized by the instant invention.

DESCRIPTION OF THE PREFERRED EMBODIMENT

With reference now to the drawings, and in particular to FIGS. 1 to 9 thereof, a new and improved fluid vacuum apparatus embodying the principles and concepts of the present invention and generally designated by the reference numeral 10 will be described.

More specifically, the fluid vacuum apparatus 10 of the instant invention includes a cylindrical coaxially aligned housing 11, including a housing upper terminal end 12 and a housing lower terminal end 13. The housing upper terminal end 13 mounts a lid member 14 thereto, with the lid member 14 including a piston rod 15 coaxially aligned with the cylindrical housing 11 directed through the lid member in a sliding relationship mounting a piston rod handle 16 orthogonally adjacent an upper terminal end of the piston rod 15. A piston 17 is mounted at a lower terminal end of the piston rod 15, and includes a series of rigid discs 18 mounting flexible membranes 19 therebetween to effect a sealing relationship between the piston 17 and an interior surface of the cylindrical housing 11. An upper locking pin 20 and a lower locking pin 21 is directed through apertures diametrically directed through the piston rod 15 adjacent the upper and lower terminal ends of the piston 17 for effecting maintenance in the replacement of the flexible membranes 19.

A "T" shaped junction 22 is positioned adjacent the lower terminal 12 of the cylindrical housing 11, and includes an exhaust conduit 23 orthogonally oriented relative to the axis of the cylindrical housing 11. The exhaust conduit 23 includes an externally threaded end 24 threadedly mounting a first lock ring 28 thereto. The lock ring 28 captures a first check valve 25 and a flexible porous permeable bag 29 to the externally threaded end 24. The first check valve 25, as well as a second check valve 32, includes a flexible valve plate 26 that is oriented in the first check valve 25 that projects exteriorly of the exhaust conduit 23 in confrontation with an annular opening of the flexible bag 29 that is surroundingly secured to the externally threaded end 24. The first valve 25 further includes a hinge to mount the flexible valve plate 26 to overlie a central opening of the cylindrical valve housing 27, in a manner as illustrated in FIGS. 6-8. Flexible bag 29 is further provided with elongate pockets 30 that are oriented orthogonally relative to the annular opening of the bag, wherein each of the pockets receives a reinforcing rigid plate 31 to provide geometric integrity to the bag structure to thereby enhance positioning of the bag above a water level surface providing an enlarged exhaust surface through which the water may be directed when the piston rod 15 is in the second position, as illustrated in FIG. 5, from the first position, as illustrated in FIG. 4, wherein the second position defines an exhaust or compression stroke of the piston relative to a vacuum stroke, as illustrated in FIG. 4, when the piston is directed upwardly towards the upper terminal end 12 from the lower terminal end 13. The second check valve 39 includes the flexible valve plate 26 projecting into confrontation with the piston 17 within the cylindrical housing 11 to properly orient the first and second check valves relative to the vacuum cavity 34 defined between the piston 17 and the cylindrical housing lower terminal end 13 and the externally threaded end 24 of the exhaust conduit 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fluid vacuum apparatus, comprising,
   a cylindrical housing, the cylindrical housing including a housing upper terminal end and a housing lower terminal end, the housing upper terminal end including a lid member mounted orthogonally relative to a cylindrical housing axis defined by the cylindrical housing, wherein the lid member slidingly mounts a piston rod therethrough coaxially aligned with the cylindrical housing and sealingly directed through the lid member, and
   a piston mounted to a lower terminal end of the piston rod, and
   a junction mounted to the cylindrical housing adjacent the lower terminal end, wherein the junction includes an exhaust conduit orthogonally oriented relative to the axis of the cylindrical housing, and includes an exhaust conduit end portion, the exhaust conduit end portion includes a flexible fluid porous bag mounted thereto, and
   the piston includes at least one plurality of rigid discs, and a flexible membrane mounted between adjacent rigid discs, the at least one flexible membrane arranged for sealingly securing the piston within the cylindrical housing, and the piston being in abutment with an upper locking pin positioned above the piston and with a lower locking pin positioned below the piston, wherein the upper locking pin and lower locking pin are selectively removable relative to the piston rod permitting replacement of the at least one flexible membrane.

2. An apparatus as set forth in claim 1 wherein the exhaust conduit end portion includes an externally threaded end, and a first check valve positioned within the exhaust conduit, the first check valve formed with a valve housing that is formed with a central opening, the central opening including a flexible valve plate positioned over the opening and hingedly mounted relative to the valve housing, wherein the flexible valve plate projects exteriorly of the exhaust conduit externally threaded end.

3. An apparatus as set forth in claim 2 wherein the bag includes a plurality of valve pockets directed through surfaces of the bag, wherein the valve pockets are aligned with an annular opening of the bag, wherein the annular opening of the bag is mounted to the exhaust conduit externally threaded end, and each of the pockets is arranged to slidingly receive a reinforcing rigid plate.

4. An apparatus as set forth in claim 3 wherein the cylindrical housing lower terminal end includes a second check valve positioned therewithin, the second check valve formed with a second valve housing, the second valve housing formed with a second valve housing central opening, and the second valve housing central opening provided with a further flexible plate mounted thereover, wherein the further flexible plate projects exteriorly of the lower terminal end, and a lock ring mounted to the cylindrical housing lower terminal end for selective removal of the second check valve for replacement and maintenance thereof.

* * * * *